B. P. MERRY.
ANIMAL MUZZLE.
APPLICATION FILED MAY 6, 1911.
1,051,150.
Patented Jan. 21, 1913.
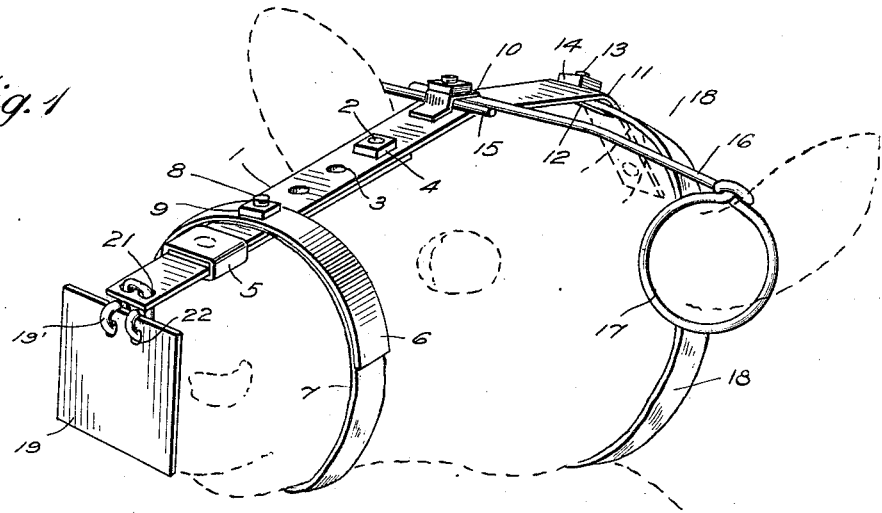
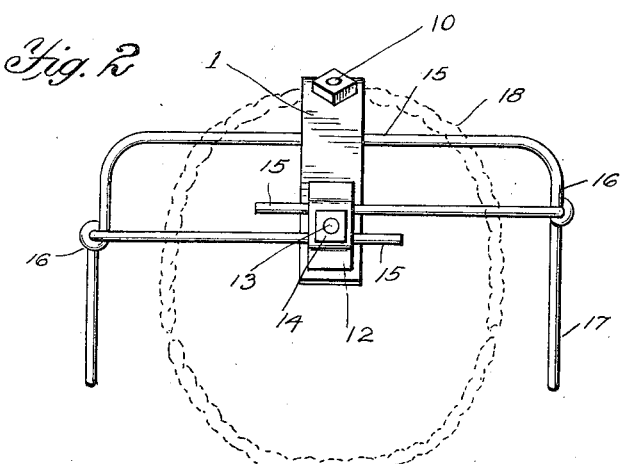
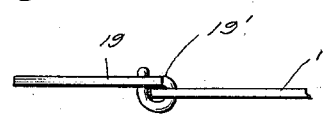
Witnesses
R. C. Claflin
M. E. Shook
Inventor
Benjamin P. Merry
By Edson Bros,
Attorneys

UNITED STATES PATENT OFFICE.

BENJAMIN P. MERRY, OF STRYKER, OHIO.

ANIMAL-MUZZLE.

1,051,150.  Specification of Letters Patent.  Patented Jan. 21, 1913.

Application filed May 6, 1911. Serial No. 625,418.

*To all whom it may concern:*

Be it known that I, BENJAMIN P. MERRY, a citizen of the United States, residing at Stryker, in the county of Williams and State of Ohio, have invented certain new and useful Improvements in Animal-Muzzles; and I do hereby declare the following to be a full, clear, and exact description of the invention, such as will enable others skilled in the art to which it appertains to make and use the same.

My invention relates to animal muzzles especially designed as a weaner. The muzzle may also be used to advantage on cows for preventing them from milking themselves.

The principal object of my invention is to provide an improved muzzle of this kind which may be adjusted to fit animals having heads of different sizes and shapes without impairing the usefulness of the device.

A further object is to provide adjustable means for securing the muzzle to the ears or horns of the animal.

Another object is to support the weaning device in front of the nose of the animal in such a manner that it may be moved upward to a limited extent so as not to interfere with the proper feeding of the animal, but cannot be raised beyond the point where it will fall again by gravity.

Further objects will become apparent from the following description.

The invention consists in the features of construction and combinations of parts hereinafter explained, illustrated in the accompanying drawing, and specified in the appended claims.

In the accompanying drawing: Figure 1 is a perspective view of the muzzle adjusted to a calf's head shown in dotted lines, a plate weaner being attached to the muzzle. Fig. 2 is an upper end view of the muzzle showing how the upper adjusting rods of the ear or horn-engaging rings are secured to the longitudinal bar. Fig. 3 is a detailed side view of the lower end of the longitudinal bar showing the plate weaner in its farthest raised position.

Referring more particularly to the drawing, 1 designates the longitudinal bar or strip which is made in two sections, one having a screw-threaded stud or bolt 2 at one end, and the other having a series of perforations 3 adapted to engage said stud for the purpose of varying the length of said bar to adjust it to animals' heads of different sizes. The two parts of the longitudinal bar are secured together by a nut 4 screwed upon the projecting end of the stud 2 and further by a metal loop 5 rigidly secured on the end of the perforated part and loosely engaging the other part of the bar. A curved or bowed strip 6, of resilient metal, is fastened at its center to the bar 1 a short distance from its lower end. The arms of said bowed strip are resilient whereby they may be bent to conform to the nose of the animal. It will be seen that said bowed piece, when engaged with the animal's nose, will retain the longitudinal bar 1 in the center of the animal's face. Also secured to the bar 1, below the bowed strip 6, is a closed band 7, preferably made of elastic. This band extends below the animal's jaw and holds the bar 1 down firmly in place. As illustrated, the bowed strip 6 and band 7 are secured to the bar 1 by means of a bolt 8 and nut 9 but any other suitable fastening means may be used, if preferred. The upper end of the bar 1 is bent, as at 10, to conform to the top of the animal's head. At each side of the bend 11, that is on the bent portion and upon the main portion of the bar 1, there is a clamp 12 secured to the bar by a bolt 13 and nut 14. Each of said clamps is formed to receive one of the arms 15 of each of the brackets 16 which have rings 17 adapted to fit over the ears or horns of the animal. It will be understood that each of said brackets 16 has two arms 15, one extending below each of the clamps 12. Said arms extend transversely to the bar 1 and are adapted to be moved laterally with respect to said arm, when the clamps are loosened, for adjusting the brackets to fit the width of the animal's head. A strap 18 is secured to the upper portion of the bar 1, preferably at the bend 11 and is adapted to be fastened around the animal's neck as a further precaution for holding the muzzle in place.

As illustrated in Fig. 1, a weaner plate 19 is pivotally hung from the lower end of the longitudinal bar 1 by means of a peculiarly shaped hinge which permits the plate to swing upward a limited distance but prevents the animal from throwing said plate upward beyond the point where it will drop again by gravity. This hinge as here shown, consists of a looped strip 19 having its arms 20 passed through perforations 21 in the end of the bar 1 and then bent upward through suitable perforations 22 in the plate, with their ends terminating adjacent to the extremity of said bar. The loop proper of the strip 19 is arranged above the bar 1, and the bent arms thereof form eyes of substantially equal diameter to the width of the edge of the weaner plate, from the perforations therein upward, which is engaged by said eyes. By reason of this construction, the upward movement of the plate is limited by its coming in contact with the extremity of the longitudinal bar, before said plate has been raised far enough to prevent its automatic return by gravity.

I claim:

1. In a muzzle of the character described, the combination, with an adjustable longitudinal bar, of brackets having rings for engaging the ears or horns of an animal, said brackets also having adjusting arms extending transversely to said bar, means to clamp said arms to said bar, and a weaner attached to the lower end of said bar.

2. In a muzzle of the character described, the combination, with a longitudinal adjustable bar having its upper ends bent to conform to the top of an animal's head, of brackets having rings adapted to engage the ears or horns of the animal, each of said brackets having two adjusting arms extending transversely to the bar, clamps on said bar at either side of the bend therein, one of the arms on each of said brackets being secured by each of said clamps, and a weaner on the lower end of said bar.

3. In a muzzle of the character described, the combination, with a longitudinal adjustable bar having its upper ends bent to conform to the top of an animal's head, of brackets having rings adapted to engage the ears or horns of the animal, each of said brackets having two adjusting arms extending transversely to the bar, clamps on said bar at either side of the bend therein, one of the arms on each of said brackets being secured by each of said clamps, a strap secured to the bar at the bend therein and adapted to be fastened around the animal's neck, and a weaner on the lower end of said bar.

4. In a muzzle of the character described, the combination, with a longitudinal bar and means to fasten it to an animal's head, of a weaner hung from the lower end of said bar by a hinge which permits said weaner to swing upward to a limited extent but prevents it moving upward beyond the point where it would be automatically returned by gravity, said hinge comprising a looped strip attached to the bar and having its arms bent into the form of eyes engaging the weaner.

In testimony whereof, I affix my signature, in presence of two witnesses.

BENJAMIN P. MERRY.

Witnesses:
 FRED MERRY,
 C. T. CAULKINS.

---

Copies of this patent may be obtained for five cents each, by addressing the "Commissioner of Patents, Washington, D. C."